Oct. 9, 1945.  H. T. KRAFT  2,386,478
TORQUE TRANSMITTING CONNECTION
Filed June 23, 1943  2 Sheets-Sheet 1

INVENTOR
*Herman T. Kraft*
BY
*Evans & McCoy*
ATTORNEYS

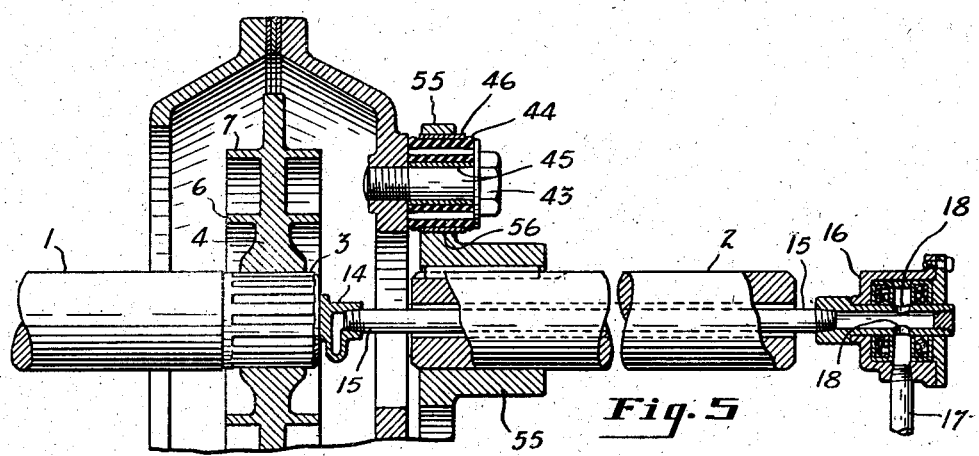
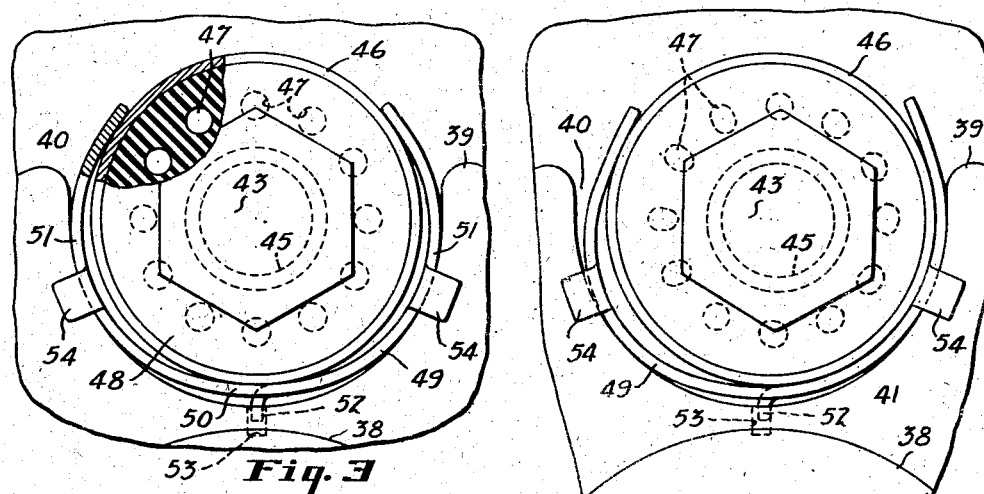
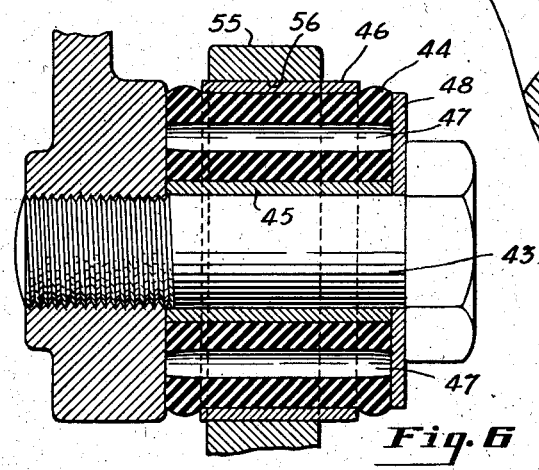

Patented Oct. 9, 1945

2,386,478

UNITED STATES PATENT OFFICE 2,386,478

TORQUE TRANSMITTING CONNECTION

Herman T. Kraft, Akron, Ohio, assignor to The General Tire & Rubber Company, Akron, Ohio, a corporation of Ohio Application June 23, 1943, Serial No. 491,933

8 Claims. (Cl. 64—11)

This invention relates to torque transmitting connections designed to yieldingly cushion torsional shocks in clutches, shaft couplings, and the like.

An important object of the present invention is to provide a torque transmitting connection which is sufficiently yieldable to effectively absorb severe torsional impulses and which is effective even though there be slight eccentricity or slight angularity of the members applying and receiving the torque.

A further object of the invention is to provide a yieldable torque transmitting connection which is of relatively simple and inexpensive construction, but which is suitable for heavy duty clutches and shaft couplings.

A further object of the invention is to provide a connection of the character described in which the cushioning is done by a number of cushioning units, each of which is of simple and inexpensive construction, the units being so mounted in the connection that the connection may be quickly and easily assembled and any one of the units may be quickly and easily replaced.

With the above and other objects in view, the invention may be said to comprise the connection shown in the accompanying drawings, hereinafter described and particularly set forth in the appended claims together with such variations and modifications thereof as will be apparent to one skilled in the art to which the invention pertains.

Reference should be had to the accompanying drawings forming a part of this specification in which:

Fig. 3 is an enlarged side elevation of one of the cushioning units;

Fig. 4 is a side elevation of a cushioning unit showing the positions which the parts of the cushioning unit assume when the connection is subjected to a severe torque load;

Fig. 5 is an axial section showing a slightly modified embodiment of the invention; and Fig. 6 is a fragmentary section on an enlarged scale through the cushioning unit shown in Fig. 5.

Figure 1:
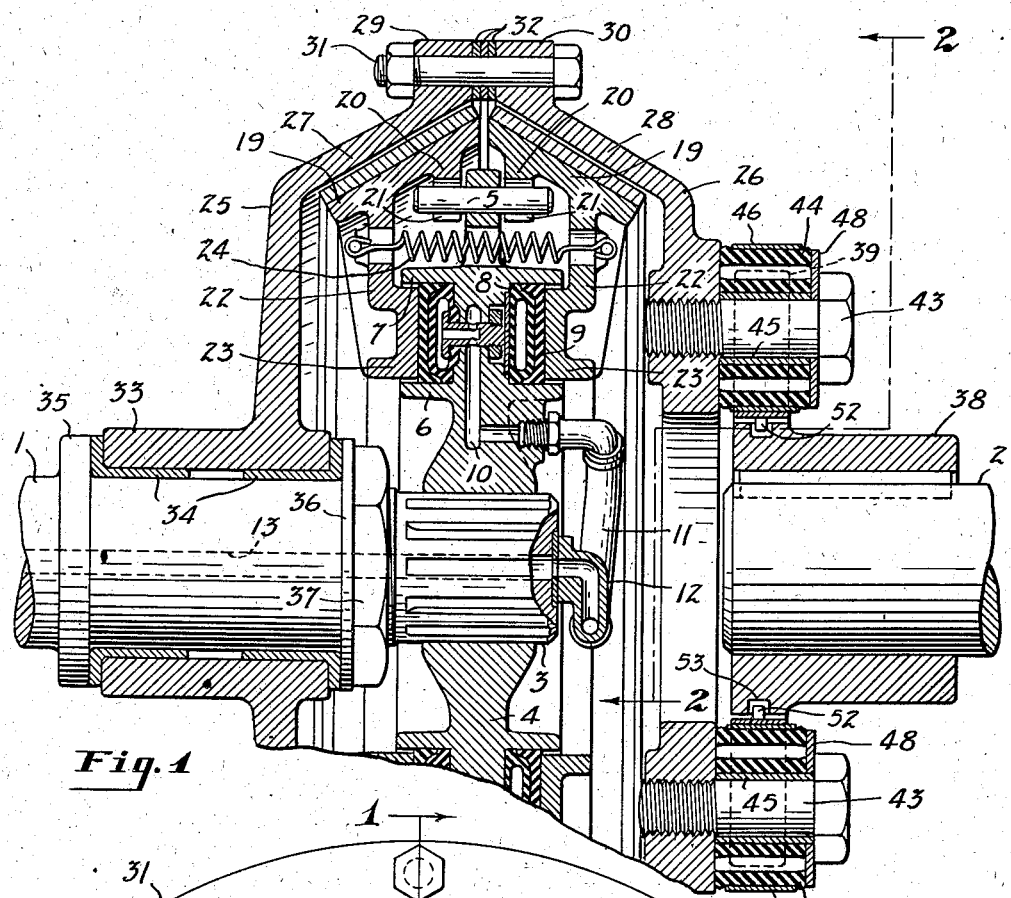
Figure 1 is an axial section through a clutch employing the connection of the present invention.
Figure 2:
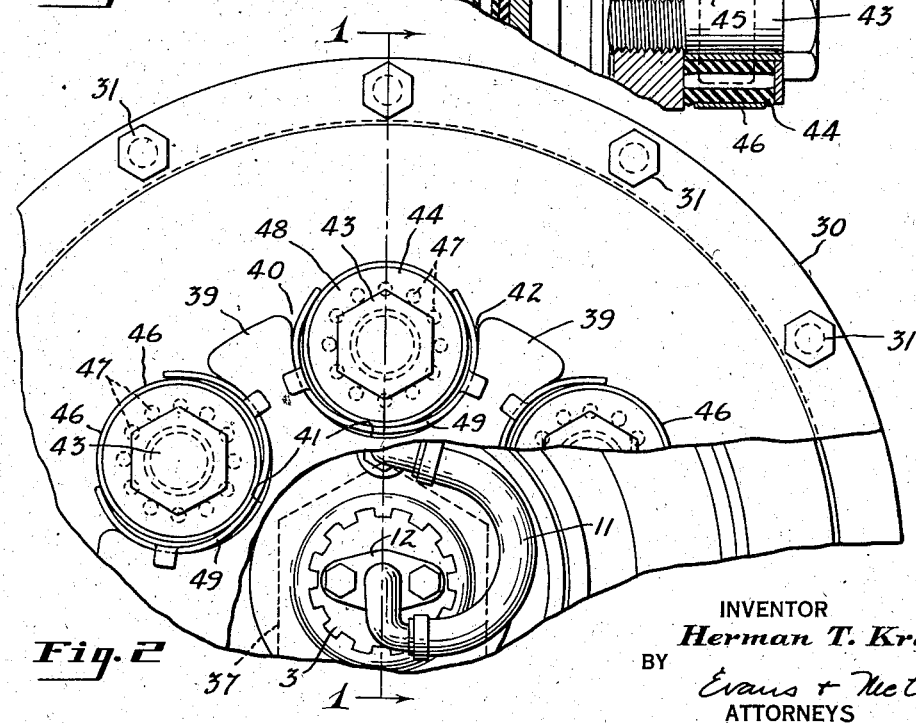
Fig. 2 is a fragmentary side elevation of the clutch shown in Fig. 1, viewed as indicated at 2—2 in Fig. 1.

In the accompanying drawings, the torque transmitting connection of the present invention is shown applied to a clutch which provides a driving connection between axially aligned shafts 1 and 2. The shaft 1 has a splined end 3 of reduced diameter upon which a torque disk 4 is slidably mounted. The disk 4 has transverse driving pins 5 adjacent its periphery and has inner and outer cylindrical flanges 6 and 7 on opposite faces which provide annular channels which open laterally and which are disposed back to back. An inflatable rubber annulus 8 is mounted in each of the channels and an annular rubber piston member 9 is mounted in each channel against the outer face of each annulus 8. Fluid under pressure is supplied simultaneously to both inflated rubber annuli through a passage 10 in the disk 4, suitable connection being provided between the passage 10 and each of the two annuli 8. A pipe 11 connects the passage 10 with a fitting 12 which is disposed axially of the shaft 1 and which may be supplied with fluid under pressure through an axial passage 13 in the shaft 1.

It is not essential that the axial passage be formed in the shaft 1 since the fluid conduit may extend through the shaft 2 if desired, as shown in Fig. 5, where a fitting 14 is attached to the end of the shaft 1 and has attached thereto an axially extending pipe 15 which extends through a central bore in the shaft 2. Beyond the end of the shaft 2 the pipe 15 is journalled in a stationary chambered fitting 16 which is supplied with fluid under pressure through a pipe 17 and which delivers into the pipe 15 through openings 18 in the pipe which are positioned in the fluid receiving chamber of the fitting.

The pins 5 carried by the disk 4 provide supporting and driving connections for a pair of oppositely disposed conical shoes 19 which have inwardly projecting flanges 20 adjacent their inner ends which are provided with spaced slots 21 which are adapted to receive the pins 5. Each of the shoes 19 is provided with an outer inwardly extending flange 22 which has an inset annular inner edge portion 23 which is positioned in the channel of the disk in engagement with one of the pistons 9. The shoes 19 are normally held in retracting positions by coil springs 24 which are attached at their opposite ends to the flanges 22. The conical friction shoes 19 cooperate with an outer drum composed of two disk sections 25 and 26 which have conical portions 27 and 28 overlying the shoes 19 and edge flanges 29 and 30 which are provided with flat opposed inner faces. The flanges 29 and 30 are secured together by means of a series of bolts 31. A plurality of spaced shims 32 are preferably interposed between the opposite faces of the flanges 29 and 30 and by inserting or removing shims, the two disks 25 and 26 may be adjusted to vary the clearance between the conical portions 27 and 28 of the disks and the internal conical shoes 19.

By reason of its sliding connection with the shaft 1 the torque disk 4 is automatically centered with respect to the conical portions 27 and 28 of the drum upon engagement of the shoes 19 with the portions 27 and 28.

As shown in Fig. 1 of the drawings, the main support of the sectional drum is on the shaft 1, the disk 25 having a hub or bearing portion 33 which is provided with a bushing 34 and rotatably mounted upon the shaft 1, the hub 33 being held against axial movements by a flange 35 on the shaft against which one end of the bushing 34 abuts and a washer 36 which engages the opposite end of the bushing and which is held in place by means of a nut 37 screwed on the shaft 1. It is not essential, however, that the drum be so mounted, since if desired, the drum may be wholly supported upon the shaft 2 as shown in Fig. 5 of the drawings.

The drum is connected to the shaft 2 through a collar 38 which is keyed to the shaft 2 and which has a flange 39 to which the disk 26 is yieldably connected. The flange 39 is provided with regularly spaced peripheral openings or slots 40 which preferably open to the periphery of the flange. The slots 40 are preferably formed with arcuate inner or base walls 41, and with side walls 42 which are disposed substantially parallel with a radius passing centrally through the slot. The disk 26 is provided with a series of driving pins in the form of bolts 43 which are screwed into threaded axial openings in the disk and which are positioned to extend centrally through each of the slots 40. In order to provide a yieldable and shock cushioning connection between the disk 26 and the shaft 2, each of the bolts 43 carries a resilient cylindrical rubber collar 44 which provides a buffer between the bolt and the flanged collar 38. To facilitate the mounting of the resilient collars 44 upon the bolts 43 and to enable the collars to be quickly and easily removed from the bolts, the collars are preferably provided with a central bushing 45 within which the bolt 43 has a sliding fit. The collar is also preferably provided with an outer band 46 which is closely fitted upon the periphery of the rubber collar.

The annular rubber collar is provided with a circumferential row of axial holes 47 which increase the yieldability of the collar. The central bushing 45 and outer band 46, which may be formed of metal, are preferably shorter than the annular rubber body 44 so that the rubber body 44 is adapted to be compressed against the outer face of the disk 26 by means of a washer 48 which is interposed between the outer end of the rubber body and the head of the bolt 43, the band 46 being shorter than the bushing so that the rubber collar may yield when pressure is exerted thereon through the band 46.

In order to increase the relative angular movement between the shaft 2 and the friction drum, the collars 44 are preferably yieldingly held out of contact with the walls of the slots 40 by means of spring seating members 49 which embrace the bands 46 of the collars. Each spring seating member 49 is formed of a single piece of resilient sheet metal bent to form a cradle in which one of the cushioning collars 44 may be seated. The member 49 has a base portion 50 which is of less curvature than the base portion 41 of the slot and which normally bridges an arc of the base wall 41 to hold the cushioning collar spaced from the central portion of the wall 41. The spring has side arm portions 51 which are bent to a curvature greater than that of the band 46 and the side portions 51 normally bear against the opposite side walls 42 of the slots with their outer ends bearing against the band 46 to normally space the cushioning collar substantially midway between the walls 42, as shown in Fig. 3. The seating member 49 is provided with an integral lug 52 in the base portion 50 which slidably engages in a socket 53 formed in the base wall 41 of the slot. The seating member 49 is also provided with laterally bent tongues or flanges 54 which engage opposite faces of the flange 39 to hold the seating member in place in the slot, the seating members being retained in the slots by the tongues 54 and being held against turning movements in the slots by means of the lugs 52. The spring seating members 49 provide a substantial amount of play between the cushioning collar and the walls of the slots in which they are mounted. When torsional thrust is applied to the pins 43, the collar 44 is forced toward one side or the other of the slots 40 and the pressure of the band 46 against the side portion 51 of the spring seat causes the portion 51 to be flattened enough to conform to the curvature of the band 46. Torsional pressure also causes the band 46 to be pressed laterally against rubber cushioning collar 44, distorting the collar as shown in Fig. 4 of the drawings. The cushioning collar 44 and seating spring 49 provide a yielding connection between the disk 26 and the shaft 2 which will permit slight lateral displacements of the shaft 2 with respect to the axis of the shaft 1 or slight angular displacements of the shaft 2 with respect to the shaft 1 and, regardless of such displacements, a substantial amount of relative angular movement will be permitted between the shaft 2 and the shaft 1 due to the cushioning action of the spring 49 and of the cushioning collar 44.

In lighter clutches or couplings in which it is not necessary to provide for a substantial amount of misalignment, the seating spring may be omitted and the cushioning collar may fit in openings or slots of the member with which it has driving connection.

As shown in Fig. 5, the shaft 2 may be provided with a flanged collar 55 which has an opening 56 within which the band 46 of the cushioning collar has a snug fit.

It is to be understood that variations and modifications of the specific devices herein shown and described for purposes of illustration may be made without departing from the spirit of the invention.

What I claim is:

1. A yieldable torque transmitting element comprising two substantially concentric disks, one having a series of circumferentially spaced slots and the other having driving members projecting through said slots, a rubber collar on each of said members, and resilient yieldable seating members interposed between said collars and the walls of said slots.

2. A yieldable torque transmitting element comprising the substantially concentric disks, one of said disks being of annular form, of larger diameter than the other disk and having its inner peripheral portion overlapping the outer peripheral portion of the other disk, one of said disks having circumferentially spaced slots and the other of said disks having driving members projecting through said slots, a rubber collar on each of said members, and resilient yieldable seating members interposed between said collars and the walls of said recesses.

3. A yieldable torque transmitting element comprising two substantially concentric disks, one having a series of circumferentially spaced slots, each slot having an end wall of arcuate contour and side walls symmetrical with respect to a radius extending centrally through the slot, axially extending pins each extending through a slot of the slotted disk and attached to the other disk, a rubber collar on each pin, and a one-piece spring embracing each of said collars, each spring having opposite side portions which are of greater curvature than the periphery of the collar and which engage opposite side walls, and an intermediate connecting portion which is normally spaced from the arcuate end wall of the slot.

4. A yieldable torque transmitting element comprising two substantially concentric disks, one having a series of circumferentially spaced slots, each slot having an end wall of substantially arcuate contour and side walls symmetrical with respect to a radius extending centrally through the slot, axially extending pins each extending through a slot of the slotted disk and attached to the other disk, a rubber collar on each pin, each collar having an inner bushing adapted to fit upon an axially extending pin and an outer cylindrical retaining band, said collars having axial openings in the body thereof between the bushing and band, and resilient yieldable seating members mounted in said slots and embracing said bands.

5. A yieldable torque transmitting element comprising two substantially concentric disks, one having a series of circumferentially spaced slots, each slot having an end wall of substantially arcuate contour and side walls symmetrical with respect to a radius extending centrally through the slot, axially extending pins each extending through a slot of the slotted disk and attached to the other disk, a rubber collar on each pin, a one-piece spring mounted in each of said slots, each spring having a base portion of less curvature than the arcuate end wall of the slot and bridging an arc of said end wall, said spring having side arm portions of greater curvature than said band, each engaging said band at spaced points and having an intermediate portion engaging the side walls of said slot, and means for retaining said spring in said slot and for holding the spring against turning movements.

6. A yieldable torque transmitting element comprising two substantially concentric disks, one having a series of circumferentially spaced slots, each slot having an end wall of substantially arcuate contour and side walls symmetrical with respect to a radius extending centrally through the slot, axially extending pins each extending through a slot of the slotted disk and attached to the other disk, each collar having an inner bushing adapted to fit upon an axially extending pin and an outer cylindrical retaining band, said collars having axial openings in the body thereof between the bushing and band, the rubber body portions of said collar extending past the ends of said band, means associated with said driving pins for exerting axial pressure upon said rubber body to compress the same, and resilient yieldable seating members mounted in said slots and embracing said bands.

7. A yieldable torque transmitting element comprising two substantially concentric disks, one having a series of circumferentially spaced slots, each slot having an end wall of substantially arcuate contour and side walls symmetrical with respect to a radius extending centrally through the slot, axially extending pins each extending through a slot of the slotted disk and attached to the other disk, each collar having an inner bushing adapted to fit upon an axially extending pin and an outer cylindrical retaining band, said collars having axial openings in the body thereof between the bushing and band, a one-piece spring mounted in each of said slots, each spring having a base portion of less curvature than the arcuate end wall of the slot and bridging an arc of said end wall, said spring having side arm portions of greater curvature than said band, each engaging said band at spaced points and having an intermediate portion engaging the side walls of said slot, and means for retaining said spring in said slot and for holding the spring against turning movements.

8. A yieldable torque transmitting element comprising two substantially concentric disks, one having a series of circumferentially spaced slots, each slot having an end wall of substantially arcuate contour and side wall symmetrical with respect to a radius extending centrally through the slot, axially extending pins each extending through a slot of the slotted disk and attached to the other disk, each collar having an inner bushing adapted to fit upon an axially extending pin and an outer cylindrical retaining band, said collars having axial openings in the body thereof between the bushing and band, said arcuate end wall having a recess disposed centrally thereof, and a one-piece spring mounted in each of said slots, each spring having a base portion of less curvature than said arcuate end portion of the slot and bridging an arc of said end wall, said base portion having a lug projecting into said recess to hold the spring against turning movement, said lug being movable in said recess to permit the base of the spring to move toward the end wall of the slot, said spring having side arm portions of greater curvature than said cylindrical driving member, each arm portion engaging said cylindrical band and having a portion engaging a side wall of the slot.

HERMAN T. KRAFT.